United States Patent
Schuster et al.

(10) Patent No.: US 6,483,600 B1
(45) Date of Patent: Nov. 19, 2002

(54) SYSTEM AND METHOD FOR COMMUNICATING REAL-TIME FACSIMILES OVER DATA NETWORKS

(75) Inventors: Guido M. Schuster, Des Plaines; Richard G. McCallister, Chicago, both of IL (US); Sean Fendt, Strasbourg, CO (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/258,837

(22) Filed: Feb. 26, 1999

(51) Int. Cl.[7] .............................................. G06F 15/00
(52) U.S. Cl. ..................... 358/1.15; 358/442; 358/425
(58) Field of Search ................................ 358/1.15, 468, 358/442, 407, 434, 435, 425; 379/100.01, 100.09, 100.06, 100.12, 100.13, 100.15, 100.17; 370/352, 356

(56) References Cited

U.S. PATENT DOCUMENTS

| | | | | |
|---|---|---|---|---|
| 5,255,311 A | * | 10/1993 | Yoshida | 358/468 |
| 5,999,274 A | * | 12/1999 | Lee et al. | 358/434 |
| 5,999,598 A | * | 12/1999 | Henrick et al. | 379/100.01 |
| 6,151,137 A | * | 11/2000 | Henrick | 358/407 |
| 6,256,115 B1 | * | 7/2001 | Adler et al. | 358/442 |
| 2001/0033642 A1 | * | 10/2001 | Abrishami et al. | 379/100.01 |
| 2001/0035977 A1 | * | 11/2001 | Adler et al. | 358/1.15 |
| 2002/0001373 A1 | * | 1/2002 | Sakurai | 370/352 |

OTHER PUBLICATIONS

*RTP: Profile For Audio and Video Conferences With Minimal Control*, H. Schulzrinne, RFC 1890, Jan. 1996.
*SIP: Session Initiation Protocol*, Handley et al., RFC 2543, Mar. 1999.
*RTP: A Transport Protocol For Real–Time Applications*, H. Schulzrinne et al., RFC Jan. 1889, Jan. 1996.

* cited by examiner

Primary Examiner—Kimberly A. Williams
(74) Attorney, Agent, or Firm—McDonnell Boehnen Hulbert & Berghoff

(57) ABSTRACT

A system and method for communicating a facsimile reliably in real-time without using bandwidth inefficiently. A facsimile signal is created at a transmitting facsimile device and communicated to a transmitting gateway. The transmitting gateway demodulates the facsimile signal by using the modulation data rate at which the facsimile signal was sent. The image and any control information, with the exception of the DCS signal, are left coded such that processing time is not wasted on decoding the image. The facsimile signal is packetized and sent over the data network, such as the Internet. The facsimile signal is sent to a receiving gateway closest to the facsimile device that is the destination of the facsimile.

63 Claims, 8 Drawing Sheets

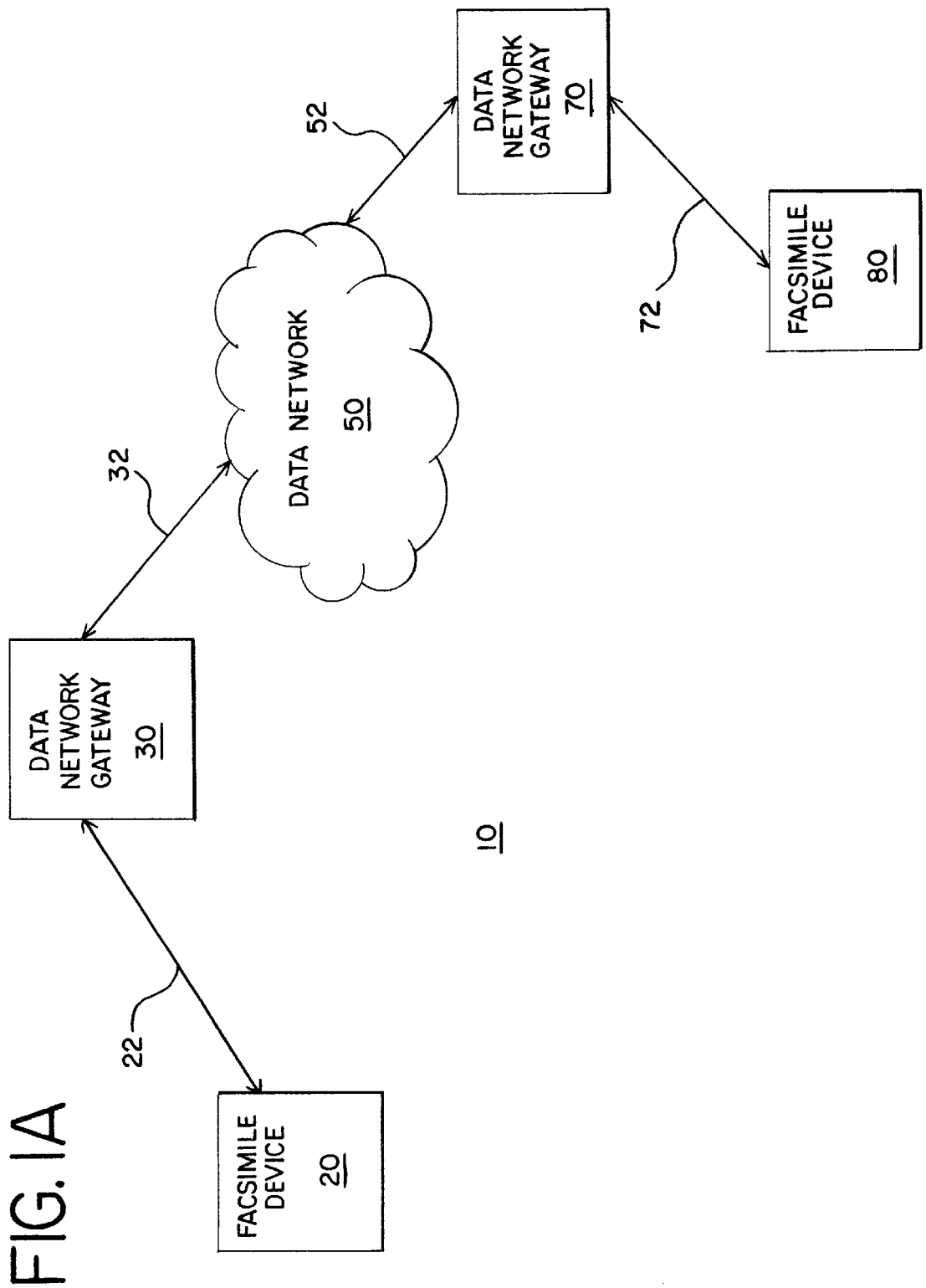
FIG. IA

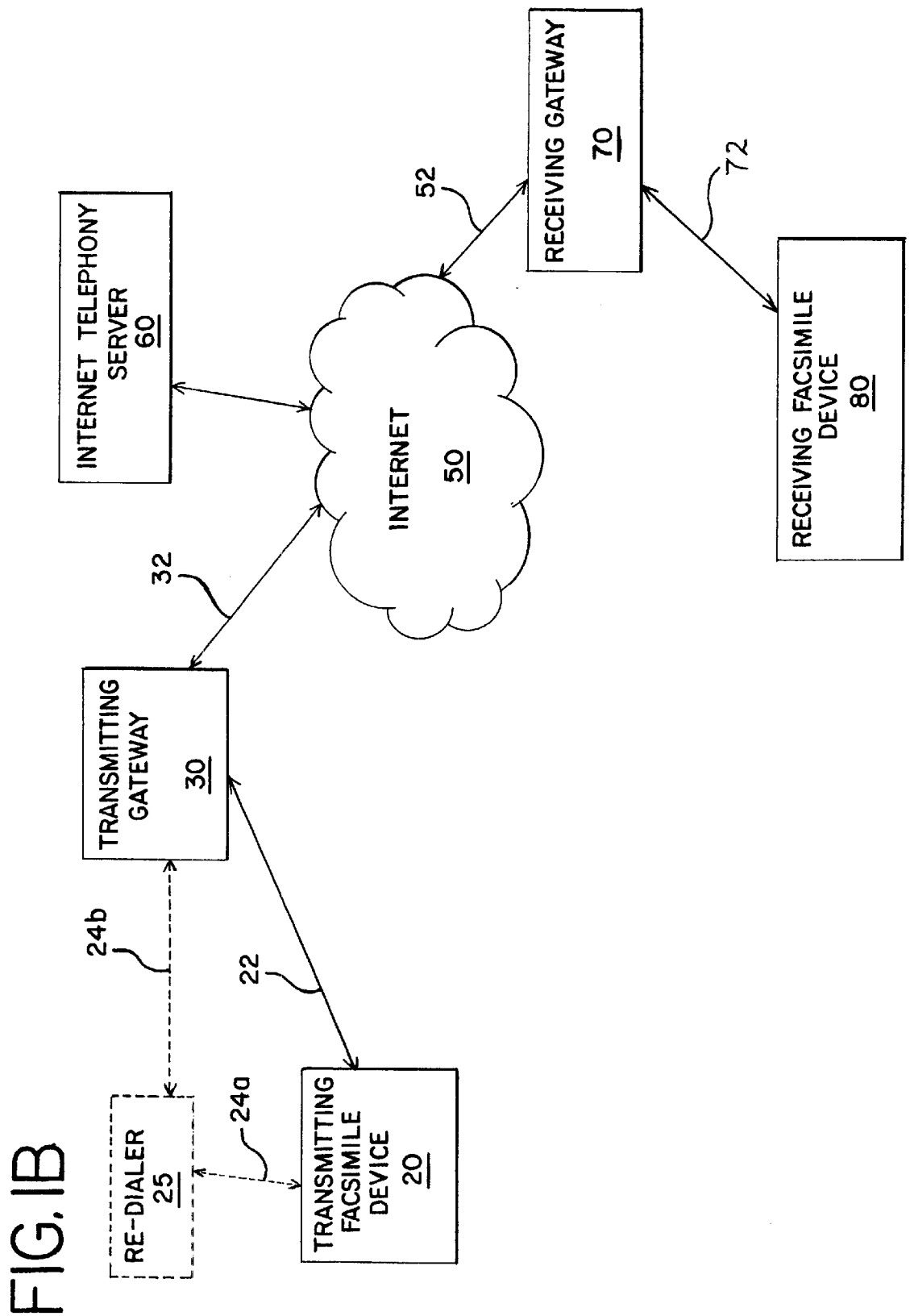
FIG. IB

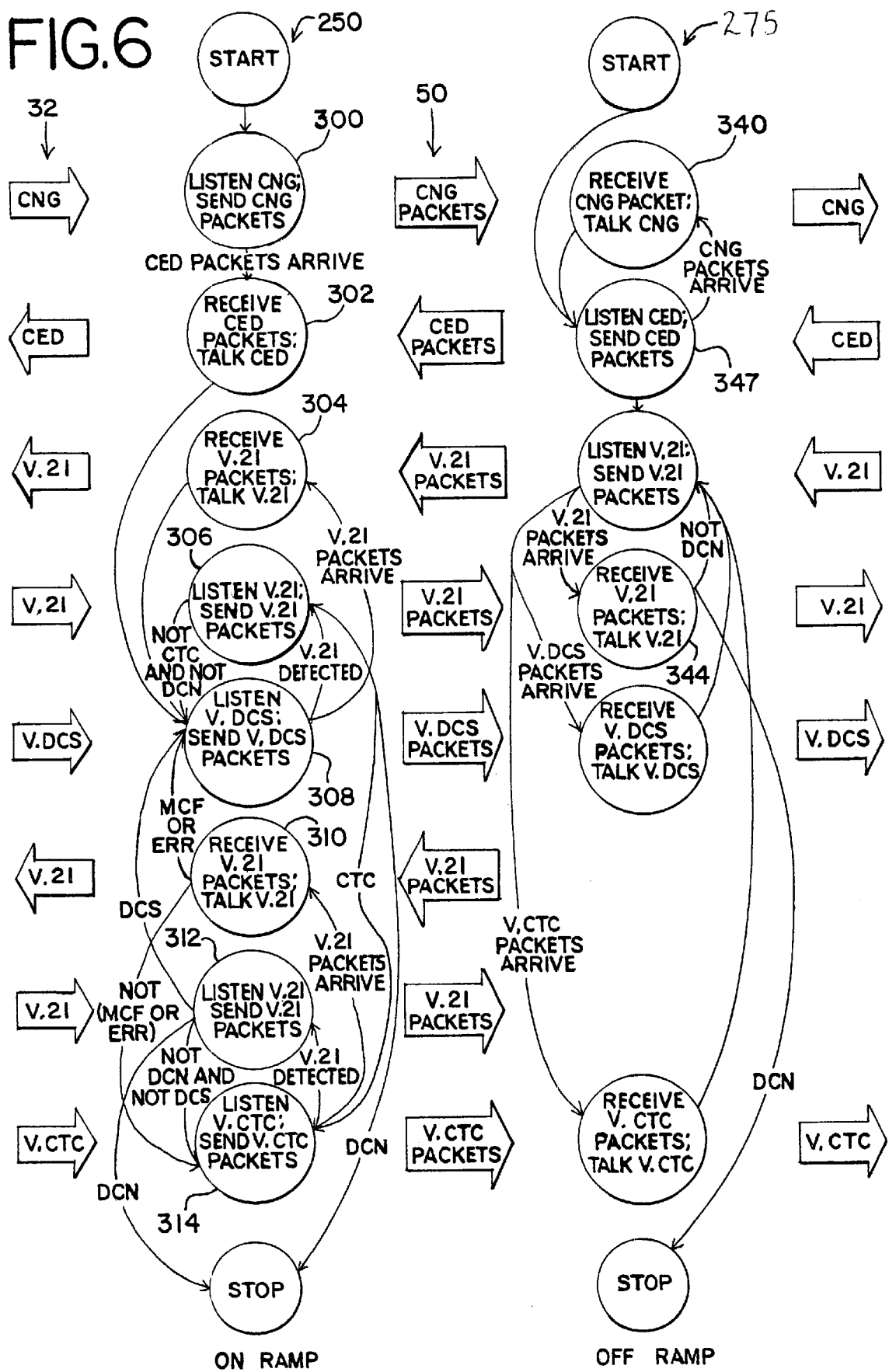

SYSTEM AND METHOD FOR COMMUNICATING REAL-TIME FACSIMILES OVER DATA NETWORKS

BACKGROUND OF THE INVENTION

A. Field of the Invention

The present invention relates to the field of data communications, and more particularly, to the communication of facsimiles over data networks.

B. Background of the Invention

Wide-area data networks, the Internet in particular, have grown in their reach and capability to the point where they provide a practical alternative infrastructure for performing many communications functions that are presently performed over the general switched telephone network (GSTN). Voice telephone calls over a data network such as the Internet, referred to as Voice-over-IP ("IP" refers to "Internet Protocol", a network protocol used for transporting data over the Internet), allows callers to converse over the telephone with only limited use of the GSTN equipment provided by the local and long distance service providers.

In comparison to dedicated circuit-switched connections established by the GSTN, the Internet provides voice communications, as well as multimedia communication such as text, graphics, video and audio, over a packet-based network. A voice over IP call establishes a virtual call connection between two or more callers through the system of interconnected packet-based networks that make up the Internet, intranets and other digital networks that provide connectivity between users.

In a virtual call connection, voice information is typically carried to a network gateway over a local GSTN connection as G.711-coded signal. The voice information is broken up into packets that are transmitted over the different networks that carry the virtual connection to a second network gateway near another party to the connection. The packets are converted back to G.711-coded signals, which are carried over a second local connection to the other party. By using the public Internet to carry the packets, users substantially avoid the fees and charges levied by the long distance service providers who provide the GSTN equipment and service. The VoIP system can be a desirable alternative to those telephone users who wish to save on their telephone bills and can tolerate the occasional delays and dropouts or loss of quality of service due to data traffic congestion on the public Internet.

Similar advantages are available to users who may wish to communicate facsimiles over the Internet. A virtual connection may be created for a facsimile transmission of one or more documents between callers by using facsimile machines at each end. The G.711-coded signals that carry the facsimile information may be packetized by the network gateways for transport over the public Internet in the same way as voice over IP calls.

One problem with using voice over IP virtual call connections for communicating facsimile information is that it makes inefficient use of the bandwidth. A voice over IP connection using G.711 has an average bandwidth requirement of 100 kbps and a typical facsimile connection has a data rate of 9600 bps. It would be inefficient to use a voice over IP virtual call connection for facsimile connections requiring only approximately $1/10^{th}$ of its bandwidth. Furthermore, Voice over IP connections are fill-duplex, while 15 facsimile is half-duplex. Hence using a G.711 Voice over IP call to carry facsimile uses about 20 times more bandwidth than theoretically needed. It would be desirable to communicate a facsimile without using more bandwidth than that required by the connection rate of the facsimile transmission.

Another problem with using voice over IP connections for facsimile transmission is that they become susceptible to lost packets. Voice over IP connections are typically made using a connection-less, unreliable UDP protocol. However, voice connections are more tolerant of lost packets than facsimile transmissions. A lost packet in a voice connection may not be perceptible to the parties listening. Lost packets in facsimile transmissions may result in poor image reproduction, or at worst, an unsuccessful transmission.

One solution for making facsimile transmissions over the Internet, referred to as "Fax over IP", more efficient and more reliable is to use a store-and-forward technique.

In the store-and-forward technique, the sending facsimile machine connects to a facsimile receiver on the network gateway using T.30, the protocol used to control interaction between two facsimile machines. The facsimile receiver demodulates the facsimile signal and stores the document, or portions of the document, in memory as facsimile data before forwarding it over the Internet to another network gateway. When the network gateway receives the document or portions of the document, a facsimile sender on the other network gateway connects to the destination facsimile machine using the T.30 recommendation. The facsimile sender converts the facsimile data to the facsimile signal and sends the facsimile signal to the destination facsimile machine. The destination facsimile machine uses the facsimile signal to produce the hard copy document at the destination facsimile machine.

The facsimile receiver/sender may demodulate/modulate the facsimile signal according to standard modulation protocols, one of the most common ones being the V.21 modulation protocol. The V.21 modulation protocol uses a 300 bps data rate, but includes a digital command signal for negotiating to higher data rates (e.g. 9600 and 14,400). The V.21 modulation protocol may be used with the T.30 control procedures to provide an error correction mechanism, which permits transmission at a higher speed, but retransmissions at lower speeds when errors occur on noisy connections.

The network gateway includes a network interface that receives the demodulated facsimile signal from the facsimile receiver and packetizes the signal for transmission over the data network. The T.38 "PROCEDURES FOR REAL TIME GROUP 3 FACSIMILE COMMUNICATION BETWEEN TERMINALS USING IP NETWORKS" draft recommendation from the International Telecommunications Union (ITU) describes technical features for transporting the demodulated facsimile signal over the Internet.

One feature described in the T.38 recommendation is a payload format for organizing the packets of facsimile data. The facsimile data packets include a header for carrying transport information and a payload for carrying the data being transported.

One problem with using the store-and-forward method for Fax over IP is that it may not achieve "real-time" communication reliably. In the context of facsimile communication, "real-time" refers to the production of a document at the destination facsimile machine as the user inserts pages at the sending facsimile machine. By definition, the store-and-forward technique cannot transmit in real-time if the document is demodulated and stored in the first network gateway in its entirety before being sent over the network.

It may be possible to transmit in real-time if portions of the document are demodulated and sent over the network. However, the amount of processing required makes it difficult. Using the store-and-forward technique, the document is modulated at the transmitting facsimile machine, demodulated at the first network gateway, re-modulated at the second network gateway and demodulated once more at the destination facsimile machine. Each demodulation and modulation consumes time in processing that makes it more difficult to achieve real-time transmission.

It would be desirable to reliably transmit facsimiles over IP in real-time.

SUMMARY OF THE INVENTION

In view of the foregoing, a system is provided for communicating a facsimile in which first and second facsimile devices are connected to a general switched telephone network to send and receive a facsimile signal over the general switched telephone network. The facsimile signal is generated by encoding an image and sending the encoded image over the general switched telephone network at a modulation data rate. A transmitting gateway is connected to the general switched telephone network and to a data network. The transmitting gateway includes a facsimile receiver for receiving the facsimile signal. The facsimile receiver detects the facsimile signal by detecting the modulation data rate and converts the facsimile signal to a plurality of data units when the modulation data rate is detected.

The facsimile receiver also includes a transmitting network interface for formatting the data units as a data network signal. The transmitting network interface transmits the data network signal over the data network. The data network transports the data network signal to a receiving gateway, which includes a receiving network interface for receiving the data network signal and a facsimile sender. The facsimile sender converts the data network signal to a received facsimile signal and sends the received facsimile signal over the general switched telephone network to the second facsimile device.

In another aspect of the present invention, a method is provided for communicating a facsimile. A facsimile signal representing an encoded image is generated and transmitted over a general switched telephone network connection to a transmitting gateway at a modulation data rate. The facsimile signal is detected at the transmitting gateway. The facsimile signal is converted to a data network signal when the facsimile signal is received at the modulation data rate without decoding the image. The data network signal is transported over a data network to a receiving gateway. The data network signal is converted to a received facsimile signal and sent to a second facsimile device.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 1A is a block diagram of a data network facsimile system of a type in which the present invention finds particular use;

FIG. 1B is a block diagram illustrating alternative embodiments for establishing a connection for transmitting a facsimile using the system in FIG. 1A;

FIG. 6 is a state transition diagram showing a preferred method for communicating a facsimile using the system in FIG. 1A.

DETAILED DESCRIPTION OF THE PREFERRED EMBODIMENT

Figure 2:
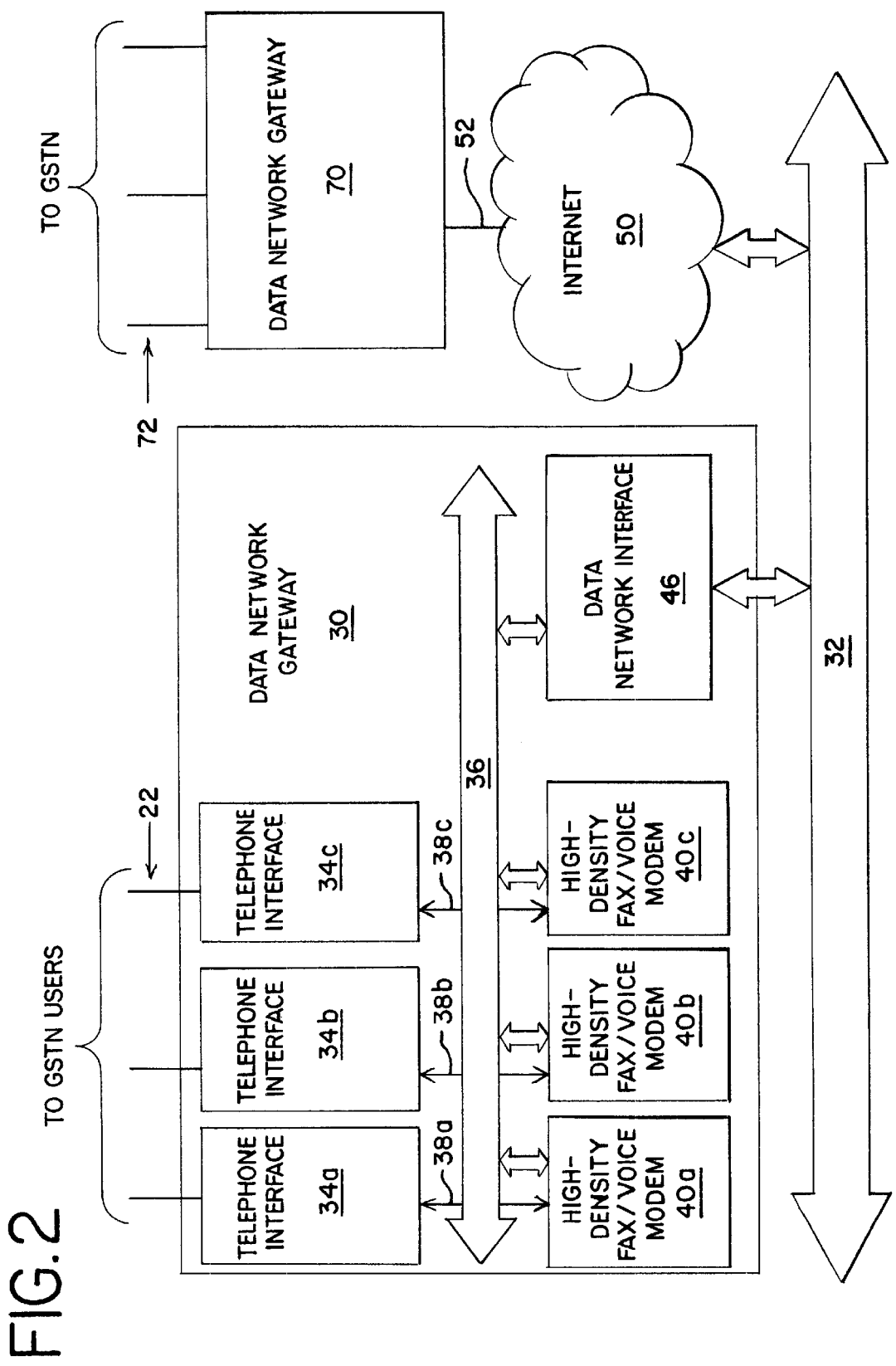
FIG. 2 is a block diagram showing the data network gateway in FIG. 1A.

A. Internet Telephony System Incorporating Facsimile Communication

Preferred embodiments of the present invention may be performed using a telephony system that replaces a substantial part of each telephone connection with a data network connection over a wide-area network. Examples of such telephony systems may be found in:

U.S. Pat. No. 6,304,574, DISTRIBUTED PROCESSING OF HIGH LEVEL PROTOCOLS, SUCH AS REAL TIME TRANSPORT PROTOCOLS, IN A NETWORK ACCESS SERVER" to Daniel School et al.

U.S. Pat. No. 6,259,261, "SYSTEM AND METHOD FOR EFFICIENTLY TRANSPORTING DUAL-TONE MULTI-FREQUENCY/MULTIPLE FREQUENCY (DTMF/MF) TONES IN A TELEPHONE CONNECTION ON A NETWORK-BASED TELEPHONE SYSTEM" to Stanley T. Naudus U.S. Pat. No. 5,525,595 to Walsh et al.

U.S. Pat. No. 5,577,105 to Baum et al. all of which are hereby incorporated by reference.

FIG. 1A is a block diagram of a data network facsimile system 10 of a type in which the present invention finds particular use. The data network facsimile system 10 includes a first facsimile device 20 connected, via a telephone connection 22 over a general switched telephone network to a first data network gateway 30. The first gateway 30 is connected to a packet-based data network 50, which communicates to other users of the network via devices (e.g. routers, bridges, gateways, etc.), one such device being a second gateway 70. One advantage of the facsimile over data network 10 in FIG. 1A is that it makes minimal use of the general switched telephone network regardless of the distance between the facsimile device 20, 80.

The first and second gateways 30, 70 may be connected to the data network 50 by data network connections 32, 52, which may include sub-networks and other network elements known to those of skill in the art for communicating data. In a preferred embodiment, the data network 50 is the Internet and the data network connections 32, 52 may include any type of network connection known to those of ordinary skill in the art for connecting to the Internet. Alternatively. other computer networks such as a private IP network in a WAN or a LAN (local area network) configuration may also be used.

The data network connections 32, 52 connecting the first and second gateways 30, 70 to the well-developed Internet infrastructure are preferably capable of supporting and implementing the well-known TCP/IP and UDP/IP protocols. Examples of data network connections 32, 52 include Ethernet-based local area networks (LAN) having routers, bridges or other connections to the Internet.

It is to be understood by one of ordinary skill in the art that, although the description below is directed at using the Internet as the data network 50 in preferred embodiments, any data network capable of transporting data representing real-time audio signals may be used as well. One of ordinary skill in the art would know how to make the appropriate modifications to the example embodiments described below.

One category of modifications that may be addressed by one of ordinary skill in the art involves the protocols selected for processing the data and signals communicated. Preferred embodiments make use of the following protocols and standards as discussed in the description that follows:

ITU-T Recommendation G.711 (1988) "Pulse Code Modulation (PCM) of Voice Frequencies."

ITU-T Recommendation H.323 "Visual Telephone Systems and Equipment for Local Area Networks Which Provide a Non-Guaranteed Quality of Service"

ITU-T Recommendation H.225.0 (1996), *Media Stream Packetization and Synchronization on Non-Guaranteed Quality of Service LANs.*

RFC 1889: RTP: A Transport Protocol for Real-Time Applications, Jan. 25, 1996

RFC 1890: RTP Profile for Audio and Video Conferences with Minimal Control, Jan. 25, 1996

ITU-T Recommendation Q.931 Digital Subscriber Signaling System No. 1 (DSS 1)—ISDN User-Network Interface Layer 3 Specification for Basic Call Control ITU-T Recommendation H.245 Control Protocol for Multimedia Communication Handley, M., Schooler, E., and H. Schulzrinne, J. Rosenberg "Session Initiation Protocol ("SIP")", Internet-Draft (draft-ieft-mmusic-sip-12.txt) Work in Progress ITU-T Draft Recommendations H.332 (1998), *Loosely Coupled H. 323 Conferencing*

The documents listed above are incorporated by reference. It is to be understood by one of skill in the art that any reference made to the protocols listed above in the description below are by way of example. Preferred embodiments may use these protocols to take advantage of the wide acceptance of the protocols in the industry. One of ordinary skill in the art will understand that alternatives not listed above may also be used when appropriate.

The second data network gateway 70 communicates via a second telephone connection 72 over the general switched telephone network with a second facsimile device 80.

The first and second facsimile devices 20, 80 may include any facsimile device capable of facsimile transmission over the general switched telephone network. Such facsimile devices typically conform to Recommendations published by the ITU-T, such as:

ITU-T Recommendation T.30 (1996): "PROCEDURES FOR DOCUMENT FACSIMILE TRANSMISSION IN THE GENERAL SWITCHED TELEPHONE NETWORK"

ITU-T Recommendation T.4 (1996): "STANDARDIZATION OF GROUP 3 FACSIMILE APPARATUS FOR DOCUMENT TRANSMISSION"

ITU-T Recommendation T.6 (1996): "FACSIMILE CODING SCHEMES AND CODING CONTROL FUNCTIONS FOR GROUP 4 FACSIMILE APPARATUS"

In a preferred embodiment, the first and second facsimile devices 20, 80 include any Group 3 facsimile equipment having a communications interface conforming to Recommendations T.30, T.4, and, optionally, T.6.

Also incorporated in its entirety by reference herein is ITU-T Draft Recommendations T.38 (1998) "PROCEDURES FOR REAL TIME GROUP 3 FACSIMILE COMMUNICATION BETWEEN TERMINALS USING IP NETWORKS", which includes descriptions of payload formats that may be used in packets transported over the data network 50 in embodiments of the present invention.

The first and second facsimile devices 20, 80 in the data network facsimile system shown in FIG. 1A communicate facsimiles in real-time. In real-time facsimile, a document is received at the receiving facsimile device as it is being inserted in the transmitting facsimile device. In the description that follows, the transmitting facsimile device is the first facsimile device 20 and the receiving facsimile device is the second facsimile device 80. One of ordinary skill in the art will appreciate that both facsimile devices 20, 80 may be capable of performing both receiving and transmitting functions.

The first and second facsimile devices 20, 80 preferably communicate a facsimile signal using the V.21 modulation protocol. The V.21 modulation protocol, like other modulation protocols, provides for communication at a modulation data rate. A common modulation data rate used in the V.21 modulation protocol is 300 baud. Other modulation data rates are available using the V.21 modulation protocol as described below. The facsimile signal is coded by the transmitting facsimile device 20 according to a standard facsimile encoding scheme or facsimile control protocol, to represent an image that may be decoded by the receiving facsimile device 80. One example of a facsimile control protocol is T.30. The receiving facsimile device 80 produces a facsimile document in response to the decoded facsimile signal.

During the facsimile transmission, the transmitting facsimile device 20 transmits the facsimile signal over the general switched telephone network over connection 22. The connection 22 may be created when the user dials a first telephone number to connect to the first gateway 30. FIG. 1B shows the data network facsimile system 10 of FIG. 1A with an Internet telephony server 60 connected to the Internet such that it is accessible to the first and second gateways 20, 80. Once the user has connected to the first gateway 30, the user may be prompted for the telephone number of the receiving facsimile device 80. When the user enters the telephone number, the first gateway 30 may request any access control information, account information or any other administrative information. The first gateway 30 queries a telephony server 60 for an identification for the receiving gateway 80, which the server 60 determines to be the gateway that is closest to the telephony connection accessed by the destination telephone number.

FIG. 1B also shows an alternative embodiment for setting up a facsimile connection. In FIG. 1B, the transmitting facsimile device 20 may be connected to a re-dialer 25 using a re-dialer connection 24a. The re-dialer 25 connects the first facsimile device 20 to the general switched telephone network at a re-dialer connection 24b. The user may initiate a facsimile transmission connection by dialing the telephone number for the receiving facsimile device 80 at the transmitting facsimile device 20. The re-dialer 25 intercepts the receiving telephone number and stores it. The re-dialer 25 may be programmed or wired to dial the telephone number for accessing the first gateway 30. Once the first gateway 30 responds, the re-dialer 25 may transmit the receiving telephone number automatically, or in response to query. One advantage of using the re-dialer 25 is that it is easier to use. The user may communicate by facsimile over a data network by following the same steps used to communicate by traditional facsimile over switched circuits.

The telephone number may be transmitted using dual-tone multi-frequency (DTMF) signals or as digitized packets.

The re-dialer 25 may be implemented as special purpose circuitry that is programmed or wired to perform the above-described functions. Alternatively, the re-dialer 25 may be implemented in a server or in a general purpose computing platform.

A facsimile transmission may be made once the connection between facsimile devices 20, 80 and gateways 30, 70, and the transport session between the first and second gateways 30, 70 are made. In describing the process of transmitting a facsimile over the data network 50 according to preferred embodiments of the present invention below, the first gateway 30 will be referred to as the transmitting gateway 30. The second gateway 70 will be referred to as the receiving gateway 70. One of ordinary skill in the art will appreciate that any gateway used in embodiments of the present invention may be both a transmitting and receiving gateway.

The Internet telephony server 60 may be used to provide the identification of receiving gateways, including the receiving gateway 70, as well as other accounting or security features. Examples of servers in Internet telephony systems that may be used to perform one or more of these functions include the Gatekeeper, the LDAP directory server and the Domain Name Server.

The data network facsimile system 10 provides real-time facsimile service reliably while efficiently using available bandwidth. The first and second gateways 30, 70 include facsimile receivers and senders, which identify the facsimile signal according to the modulation data rate used for the facsimile communication. By using the modulation data rate to detect the facsimile signal, bandwidth on the data network is used more efficiently than if the facsimile data was transported as a typical voice telephone signal.

Moreover, the transmitting gateway 30 does not perform a full demodulation of the facsimile signal by decoding the facsimile signal according to the facsimile control protocol. In a full demodulation of a facsimile signal, the entire document image is decoded, fully or in portions, at the transmitting gateway 30 before it is transported over the data network 50. The process of decoding the image may require enough processing power to slow the transmission of the facsimile enough to where it is no longer in real-time. In addition, the T.30 state machine is not run inside the modem. Other factors such as heavy data network traffic and the need to decode documents having graphics may only reduce the probability of successful transmission in real-time.

Embodiments of the present invention instead perform, at most, a partial demodulation at the transmitting gateway 30. Rather than decoding the entire document image using the facsimile control protocol, the facsimile receivers detect the modulation data rate that indicates that a facsimile is in transmission. The transmitting gateway 30 detects the modulation data rate and digitizes the facsimile signal for transport over the data network as packets. Because little additional information in the facsimile data signals is used, the processing power required by the transmitting gateway 30 to convert the facsimile signal to data packets is reduced.

B. The Data Network Gateways

The data network gateways 30, 70 in FIG. 1 are devices that are known in the art as remote access servers, also referred to as network access servers. Such devices are currently available from several companies, for example, the Total Control™ Enterprise Network Hub is available from 3Com Corporation. The data network gateways 30, 70 in FIG. 1 incorporate facsimile senders, receivers, and selected Internet telephony functions as described with reference to FIG. 2.

FIG. 2 shows an example of a network access server used as the transmitting and receiving gateways 30, 70 according to a preferred embodiment of the system shown in FIG. 1A. The transmitting gateway 30 in FIG. 2 may include at least one high-density FAX/modem 40a–c. The functions of a facsimile receiver/sender may be combined on one module with those of a high-density modem used for traditional data communications. In a preferred embodiment, the facsimile receiver/sender is combined with a voice coder/decoder that may be used to perform Internet telephony. Each high-density FAX/modem 40a–c is connected to a telephone line interface 34a–c.

The high-density FAX/modems 40a–c communicate with a network interface 46 over a packet system bus 36. The high-density FAX/modems 40a–c, the telephone line interfaces 34a–c and the network interface 46 are preferably on individual printed circuit boards or cards arranged in a chassis. Such organization provides modularity to the gateway 30 allowing for various configurations to accommodate particular applications or installations.

The high-density FAX/modems 40 are "high density" in that each card contains a high-density digital signal processing (DSP) configuration capable of handling 23, 24 or 30 DSO channels. For example, each high-density FAX/modem 40 may perform modem functions for 23 B channels plus 1 D channel for an ISDN Primary Rate Interface, 24 DSO channels for a T1 line and 30 channels for an E1 line. By providing a set of high-density FAX/modems 40, in a robust computing platform in the network interface 46, a single chassis can process many hundreds of calls through the device simultaneously.

In the embodiment of FIG. 2, each high-density FAX/modem 40 has its own telephone line interface connected to an ISDN PRI or Ti line at connections 22. Each telephone line interface 34a–c is connected to the high-density FAX/modems 40a–c by a TDM bus 38a–c.

The telephone line interface 34 card is composed of two separate modules (not shown), an incoming call interface module and an incoming call application module. The interface module physically receives the incoming Ti span lines at connection 22, converts the signal in a digital TTL format, and delivers the signal to the incoming call application module. The interface module provides a channel switching unit (CSU) interface which recovers clock signals and data from the incoming T1 signals, and also provides the transmission of outgoing digital telephone signals representing digital data to the T1 line at connection 22. The application module provides framing of recovered T1 data to extract the T1 DSO channel data and then switches the channel data twenty four time slots on a TDM bus 38 to the corresponding high-density FAX/modem 40, 42, 44.

The high-density FAX/modems 40a–c are connected to the network interface card 46 via a high-speed parallel packet bus 36. The number of high-density FAX/modems 40 and associated telephone line interface cards 34 is essentially arbitrary, but 10 to 24 such cards are typical in a high density gateway application today, providing modem and facsimile functionality for between 240 and 576 T1 DSO channels.

The network interface card 46 consists of a general purpose-computing platform (such as an IBM PC) running an operating system such as Windows NT™ from Microsoft Corporation or UNIX. The network interface card 46 contains software and hardware modules to perform call routing, modem configuration and other features. The network interface card 46 may also be a separate computing platform with a connection to the packet bus 36. In a preferred embodiment, the network interface card 46 is an or EdgeServer™ from 3Com Corporation.

The packets that are communicated over the packet bus 36 have a structure that is dependent on the communications protocols implemented in the gateways 30, 70. In a preferred embodiment, the packets have a basic structure as shown in Table 1.

TABLE 1

| HEADER | PAYLOAD |
| --- | --- |

The packet header shown in Table 1 may include control information such as a source identification, a destination identification, a data type identifier, a payload size, a sequence number, or other information used to ensure reliable transport of the packet. The packet payload includes the data being communicated by the transmitting facsimile device 20 to the receiving facsimile device 80. The packet communicated over the packet bus 36 will be referred to in the description below as facsimile packets. Facsimile packets may be formatted according to selected protocols. In a preferred embodiment, the format for the facsimile packet will conform to the Internet facsimile Packet format described in the T.38 recommendation. Packet formats according to a preferred embodiment of the present invention are described below with reference to FIG. 5.

It is to be understood by one of ordinary skill in the art that the high-density FAX/modems 40a–c include facsimile senders as well as receivers such that the transmitting gateway 30 may perform receiving functions. The structure of the receiving gateway 70, for purposes of facsimile communication, is therefore substantially the same as the structure of the transmitting gateway 70.

The gateways 30, 70 shown in FIG. 2 are useful for a number of different types of applications, such as Internet access, remote access to corporate backbone networks, video and audio conferencing, Internet telephony, digital wireless Internet and corporate network access, to name a few. In an Internet telephony embodiment, the product provides a facility for users to engage in long distance telephone, audio/visual and/or data sessions using the Internet as the transport medium rather than the long distance public switched telephone network of the inter exchange carriers. Users realize substantial savings in transmission charges as compared to telephone charges. Similar advantages are realized when using the gateways 30, 70 for facsimile communication. Furthermore, the gateways 30, 70 used in embodiments in the present invention also provide facsimile communication that efficiently uses available bandwidth and reliably transmits in real-time.

In a preferred embodiment, the gateway 30 described in FIG. 2 is used as a network interface for communicating facsimiles from facsimile devices over a data network. The gateways 30, 70 described in FIG. 2 establish communications with the transmitting and receiving facsimile devices 20, 80 and between each other to initiate the facsimile communication. The gateways 30, 70 also monitor the facsimile communication until it is complete.

A facsimile communication using embodiments of the present invention is made up of three basic stages: Call Setup, Facsimile transmission, and Call teardown. The facsimile communication over the data network is a telephone connection that is set up in a manner similar to the call setup of an Internet telephony connection. In typical Internet telephony connections, a circuit-switched connection 22 is made over the general switched telephone network to the data network gateway 30. The data network gateway 30 performs call setup functions by receiving a telephone number or other identification of the destination facsimile device. The data network gateway 30 uses the identification of the destination facsimile device to determine the receiving data network gateway 70 that is closest to the destination facsimile device.

In a preferred embodiment, the negotiation of the telephone call between the facsimile device 20 (or re-dialer 25) is performed by the telephone line interface cards 34. The telephone line interface cards 34 selects a channel on the connection 56 to the high-density FAX/modem 40. The high-density FAX/modem 40 determines whether the telephone call is for a facsimile communication or for a data communication by detecting a Calling signal (e.g. the CNG in the T.30 recommendation). When the Calling signal is detected, the high-density FAX/modem 40 uses the facsimile receiver to process the facsimile signal. The calling signal is packetized and communicated over the packet bus 36 to the network interface 46.

An Internet data transport connection is then established between the transmitting gateway 30 and the receiving gateway 70 over which facsimile data units (described below) are communicated. The receiving gateway 70 also establishes a telephone, circuit-switched connection 72 over the general switched telephone network to the receiving facsimile device 70. The receiving gateway 70 receives the Calling signal in packetized form over the transport connection. The receiving gateway 70 then receives the destination telephone number and uses it to dial a telephone call from the telephone line interface 34 to the destination facsimile device 80. The receiving facsimile device 80 may then transmit a Called signal (e.g. CED in the T.30 recommendation) back to the transmitting gateway 30 over the newly established data transport connection to indicate successful establishment of a facsimile connection. Once the connection is established, facsimile transmission begins.

During the transmission of the facsimile, the facsimile data units are transported over the Internet between the transmitting gateway 30 and the receiving gateway 70. The receiving gateway 70 re-modulates the facsimile data units to create the facsimile signal, which is communicated over the general switched telephone network to the receiving facsimile device 80.

The call tear-down is begun when the end of the communication is signaled; either by normal conclusion of the transmission or by an unrecoverable error condition. During call tear-down, the data transport connection between the transmitting gateway 30 and the receiving gateway 70 is disconnected. In addition, the circuit-switched connections 22, 72 between the facsimile devices and the gateways are also disconnected.

C. Network Interface for Facsimile Communication

Figure 3:
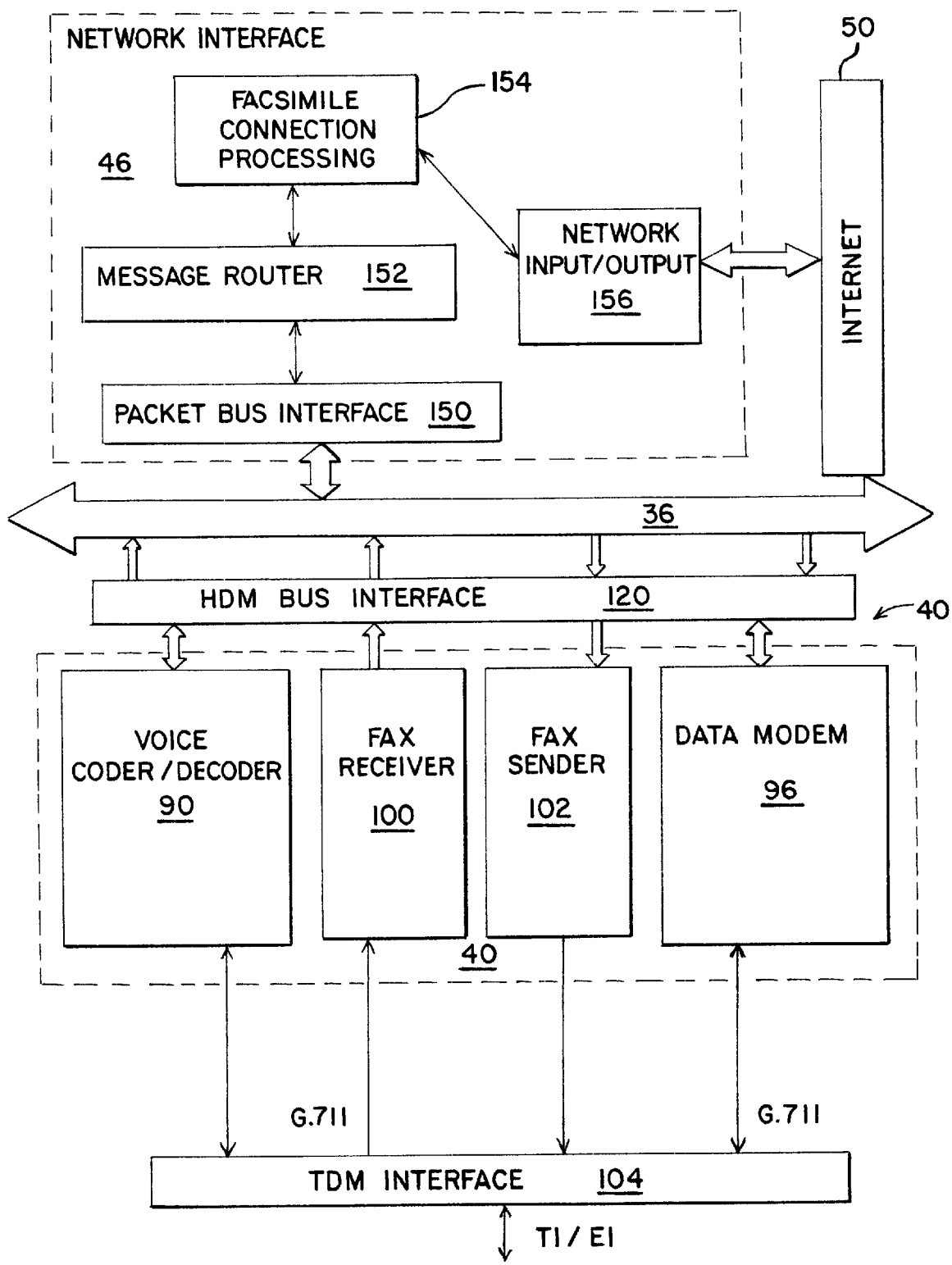
FIG. 3 is a block diagram showing hardware and software structure of the Internet telephony gateway of FIG. 2.

FIG. 3 is a high level diagram of the hardware and software structure of components for communicating facsimiles in the transmitting gateway 30 (and therefore of the receiving gateway 70) shown in FIG. 2. The diagram includes structure of the network interface 46 and one of the high-density FAX/modems 40. The network interface 46 includes a facsimile connection processor 154, a packet bus interface 150, a message router 152, and a network I/O controller 156. The network interface 46 communicates with a high-density FAX/modem 40 through the packet bus interface 150 that interfaces to the packet bus 36.

The high-density FAX/modem 40 may include a voice coder/decoder 90, a facsimile receiver 100, a facsimile sender 102, and a data modem 96. Facsimile packets are received at the packet bus interface 150 from the facsimile receiver 100 for transmission over the Internet 50. Facsimile packets are received from the Internet 50 and transmitted to the facsimile sender 102 for communication to the receiving facsimile device 80. The voice coder/decoder 90 is used in Internet telephony applications and the data modem 96 is used for data communications. One of ordinary skill in the art will appreciate that the high-density FAX/modem 40 may include any combination of components shown in FIG. 3.

When facsimile packets are received from the facsimile receiver 100, the packet bus interface 150 passes the facsimile packets to the message router 152. The message router 152 determines the destination of the facsimile packets by analyzing the destination identification in the packet header. The network interface 46 receives data packets from any high-density FAX/modem 40, or for packets from the Internet 50, from any device that is communicably connected to the Internet 50. The message router 152 determines the appropriate destination for the packets. The message router 152 passes the facsimile packets that are part of a facsimile communication to the facsimile connection processor 154. The facsimile packets received from the packet bus 36 may be translated through a network interface software structure (WinSock, BSD sockets or TDI), the details of which are not important and readily derived by persons of skill in the art.

The facsimile connection processor 154 manages the setting up, monitoring and tearing down of the telephone connection. During the call setup process, the facsimile connection processor 154 in the transmitting gateway 30 receives the destination telephone number, or identification, in addition to other control information that may be required (e.g. information for accounting, billing, etc.). The facsimile connection processor 154 may receive the destination identification in a dialog of a series of queries with the facsimile device 20 in which information is communicated to the transmitting gateway 30 in series of DTMF tones. Alternatively, the facsimile connection processor 154 may receive a digital representation of the destination telephone number from the facsimile device 20.

The facsimile connection processor 154 uses the destination identification to find a gateway connected to the Internet that is closest to the destination facsimile device 80 identified by the destination identifier. The facsimile connection processor 154 may query a server that maintains a database of addresses for gateways according to telephone network area codes and local exchanges. Such a server may be on a device connected to a local network (if the transmitting gateway 30 is connected to local network, for example, over Ethernet) or on another part of the Internet. The facsimile connection processor 154 may make such queries via the network I/O controller 156. After receiving the destination identification, the facsimile connection processor 154 receives facsimile packets for transport to the receiving gateway 70 from the facsimile receiver 100 (through the message router 152).

The facsimile connection processor 154 communicates over the Internet 50 through the network I/O controller 156. The network I/O controller 156 preferably implements a stack of communications protocols that are known in the art. Examples of such protocols include TCP (transport control protocol), IP (Internet protocol), UDP (user datagram protocol) and other lower level protocols for performing data link and physical layer tasks. The network I/O controller 156 receives facsimile packets from the facsimile connection processor 154 and creates network packets by encapsulating the facsimile packets with a header and other data that may be required by the protocol selected. In a preferred embodiment, the network I/O controller 156 uses the UDP with XOR-based forward error correction (FEC) for transport control and IP (Internet protocol) for network control. Alternatively, the UDP without FEC, RTP (real-time transport protocol) or the TCP (Transport Control Protocol) may also be used. Preferably, the network I/O controller 156 uses a Network Driver Interface Specification (NDIS) for determining the protocols used by the data received from or to be sent to the packet bus 36.

Once the facsimile connection is established, the facsimile connection processor 154 maintains the call resources. These resources may include, for example:

Caller telephone number

Calling telephone number

Calling gateway IP address

Logical Port or Channel for communicating facsimile signal

The above information may be kept in a database, or may be received from the facsimile device 30.

It is to be appreciated by those of ordinary skill in the art that the network interface 46 in FIG. 3 shows one example of a hardware and software structure and that alternative hardware and software structures may be used.

D. The Facsimile Receiver/Sender

The network interface 46 communicates with the high-density Fax/modems 40 over the packet bus 36. In a preferred embodiment, the packet bus 36 is the time-division multiplexed (TDM) S-Bus, which is known to those of ordinary skill in the art. FIG. 3 shows the facsimile receiver 100 and the facsimile sender 102 in the high-density FAX/modem 40 according to a preferred embodiment. The high-density Fax/modem 40 includes an HDM bus interface 120 connected to one or more high-density Fax/modems 40. The facsimile receiver 100 and the facsimile sender 102 communicate with the network interface 46 over the packet bus 36. The facsimile receiver 100 and the facsimile sender 102 communicate with the general switched telephone network via a TDM interface 104 which connects the high-density Fax/modem 40 to the telephony interface 34 (shown in FIG. 2).

During a facsimile communication, the facsimile receiver 100 is coupled over the general switched telephone network to the transmitting facsimile device 20. The facsimile receiver 100 receives the facsimile signal as G.711 data as input and produces data packets, or facsimile packets as output. The facsimile packets include the payload for network packets, which are transported as the data network signal over the data network, or the Internet.

The T.38 Recommendation describes a full demodulation scheme in which a facsimile demodulator processes the facsimile signal according to the T.30 Recommendation. Using the T.38 Recommendation, the facsimile signal is coded as T.30 data before it is packetized for transport over the Internet. The T.30 control information and the image on an entire document, or portions of the document (e.g. lines, paragraphs, portions of pages, etc.) may be completely decoded before the data is packetized. In communicating the facsimile from the transmitting facsimile device 20 to the receiving facsimile device 80, two complete facsimile reproductions, one at the transmitting gateway 30 and another at the receiving gateway 70 are performed. The method described in the T.38 Recommendation provides for a reliable system for communicating facsimiles because error checking capabilities at each stage of the transmission. However, real-time facsimile may not be reliably achieved using T.38 because the two facsimile reproductions and the transport the facsimile over the Internet may take too much time.

In embodiments of the present invention, the facsimile receiver 100 performs only a partial demodulation of the facsimile signal by analyzing a minimum set of data and signal characteristics of the facsimile signal. In a preferred embodiment, the facsimile receiver 100 detects the modulation data rate, and may analyze, for T.30 facsimile signals, a digital command signal (DCS), a continue to correct (CTC) signal, a disconnect signal (DCN), a message confirm frame (MCF) and an error signal (ERR). Rather than processing the facsimile signal according to T.30, the facsimile receiver 100 arranges the data in packets without analyzing the data in the facsimile signal except to determine a signal characteristic to check.

In a preferred embodiment, the facsimile receiver 100 checks the signal to determine its modulation protocol data rate. Typically, the transmitting facsimile device 20 transmits using the V.21 protocol at a data rate of 300 bps. The transmitting gateway 30 "listens" or detects a 300 bps. signal. In V.21, the DCS signal is transmitted to the transmitting gateway 30 at 300 bps. and includes information relating to how the facsimile signal is to be received by the receiving facsimile device 80. Such information may include the modem speed (or data rate in bits per sec, bps.), image width, image encoding, page length and the status of the error correction mode (ECM) is to be used. The transmitting gateway 30 preferably analyzes the DCS signal only to determine the modem data rate in order to determine how to receive the facsimile signal. The transmitting gateway 30 may receive the facsimile signal by detecting a modulation data rate of 300 bps, or higher as indicated by the DCS signal. In addition, the DCS signal may indicate the use of the ECM mode, which means that in the case of an error during transmission, retransmissions are performed at a lower data rate than the one being used.

The facsimile sender 102 receives facsimile packets from the network interface 46 that are to be converted to a received facsimile signal or to a feedback facsimile signal. The transmitting gateway 30 may receive the feedback signal from the receiving gateway 70 indicating the status of the facsimile transmission. The feedback signal preferably confonis to the T.30 Recommendation and is analyzed by the facsimile sender 102 only for feedback that may indicate a change in modulation data rate.

The receiving gateway 70 uses the facsimile sender 102 to receive the data network signal sent by the transmitting gateway 30. The facsimile signal that is output by the facsimile sender 102 is the received facsimile signal that is sent to the receiving facsimile device 80. In a preferred embodiment, the received facsimile signal is as identical as possible to the facsimile signal sent from the transmitting facsimile device 20 to the facsimile gateway 30.

Figure 4:
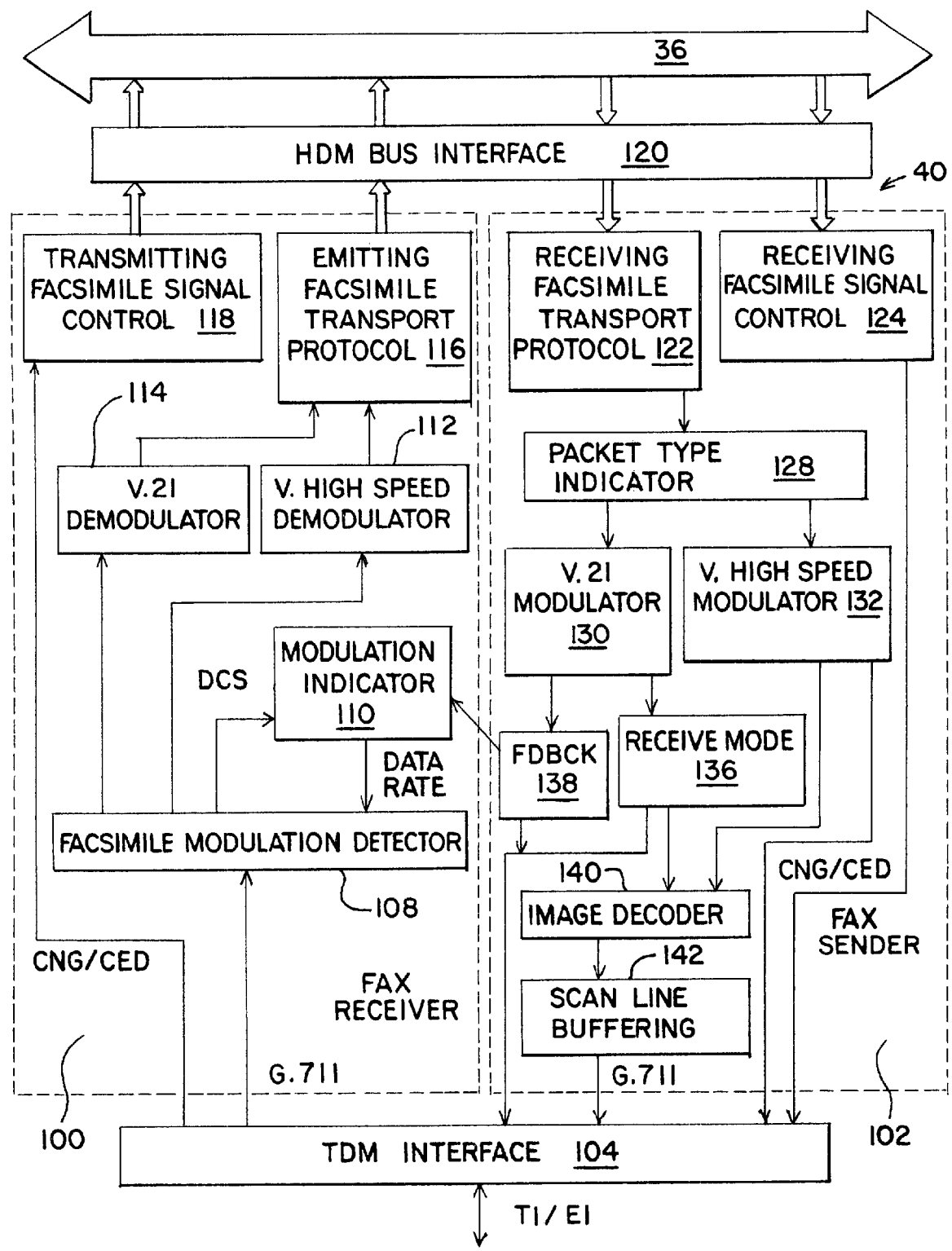
FIG. 4 is a block diagram showing hardware and software structure of the facsimile receiver/sender in FIG. 3.

FIG. 4 shows an example of hardware and software structure for the facsimile receiver 100 and the facsimile sender 102 of FIG. 3 according to a preferred embodiment. The facsimile receiver 100 includes a facsimile modulation detector 108, a modulation indicator 110, a V.21 demodulator 114, a V.High Speed demodulator 112, an emitting facsimile transport protocol driver 116, and a transmitting facsimile signal control 118.

The facsimile receiver 100 receives the facsimile signal as G.711 units from the telephony interface 34 (shown in FIG. 2) at the TDM interface 104. The signal at the TDM interface 104 is either T1 or E1, however, other signal types may be used. The TDM interface 104 sends the facsimile signal to the facsimile modulation detector 108. The facsimile modulation detector 108 analyzes the G.711-formatted facsimile signal for a data rate. The facsimile modulation detector 108 always analyzes the facsimile signal for a 300 bps. signal that is sent using V.21. The facsimile signal is preferably sent using the T.30 Recommendation and may include the DCS signal, which is sent at the V.21 300 bps. data rate. The facsimile modulation detector 108 sends the DCS signal to the modulation indicator 110. The facsimile modulation detector 108 also analyzes the data rate of the facsimile signal for the data rate provided by the modulation indicator 110.

The modulation indicator 110 analyzes the DCS signal provided by the facsimile modulation indicator 108 to determine if the data rate used by the facsimile device 20 (shown in FIG. 1B) is going to be different than 300 bps. The DCS signal may indicate a higher data rate, which the modulation indicator 110 communicates to the facsimile modulation detector 108. The facsimile modulation detector 108 is then in V.DCS mode, which means that a data rate higher than 300 bps. is expected from the transmitting facsimile device 20.

The DCS signal may also indicate the use of error correction mode (ECM) in addition to a higher speed. When the transmitting facsimile device 20 uses ECM and the CTC signal is also detected, a data rate higher than 300 bps. is expected, except for when a retransmission occurs. Retransmissions occur when the receiving facsimile device 80, or the receiving gateway 70 sends an error signal (ERR in T.30). In V.CTC mode, retransmissions after the detection of errors are sent at a lower data rate for noisy connections.

The facsimile modulation detector 108 makes the facsimile signal available to the V.21 demodulator 114 when it receives a V.21 signal, and to the V.high speed demodulator when it receives a V.DCS or V.CTC signal. The V.21 demodulator 114 and the V.high speed demodulator 112 perform the function of organizing the facsimile signal in packets. In a preferred embodiment, the V.21 demodulator 114 and the V.high speed demodulator 112 organize the facsimile signal data into frames, which are timer-based sequences of bytes of data. A frame comprises the bytes of signal collected by the demodulator 112, 114 in fixed time sequences. For example, the demodulators 112, 114 may collect data in frames every 30 ms., which is the time used by voice coders in Internet telephony applications. For a time slot of 30 ms., the frames collected by the V.21 demodulator 114 are each 9 bits and the frames collected by the V.high speed demodulator 112 using, for example, a V.17 data rate of 28,800 bps. are 52 bytes in size.

The frames collected by the demodulators 112, 114 are organized into facsimile packets by the emitting facsimile transport protocol driver 116. In a preferred embodiment, the facsimile packets use formats described in the T.38 Recommendation, in particular, the UDP transport layer (UDPTL) format. The facsimile packets are communicated over the packet bus 36 to the network interface 46. The network I/O controller 156 formats the facsimile packets into network packets by adding an IP header and a transport protocol header according to the selected protocol (e.g. TCP or UDP).

In a preferred embodiment, the UDP connection-less transport protocol is used with forward error correction.

FIGS. 5A–5D shows packet formats for different procedures for implementing forward error correction.

Figure 5A:
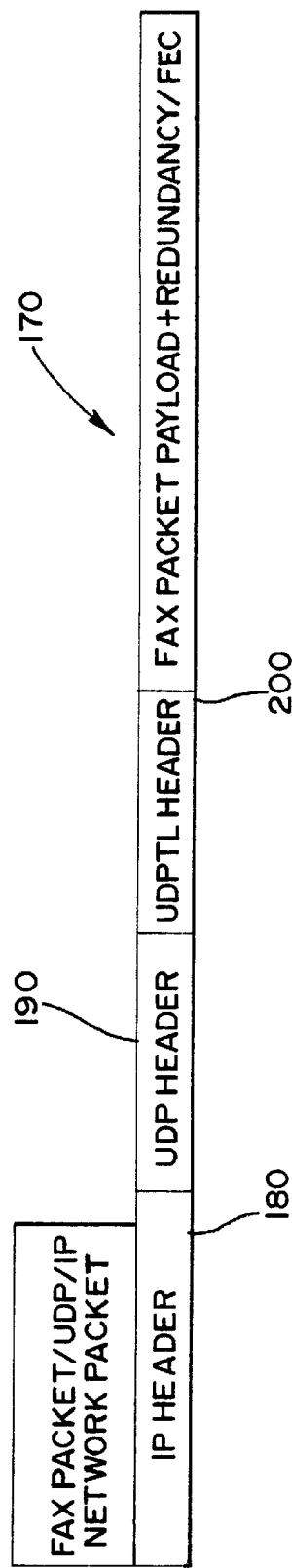
FIGS. 5A through 5D show packet formats for facsimile packets and network packets.

FIG. 5A shows a network packet as formatted by the network I/O controller 156. The network packet 170 is a UDP packet that includes an IP header 180, a UDP header 190, and a facsimile packet 200. The network I/O controller 156 attaches the UDP header 190 and the IP header 180 when it receives the facsimile packet 200.

Figure 5B:
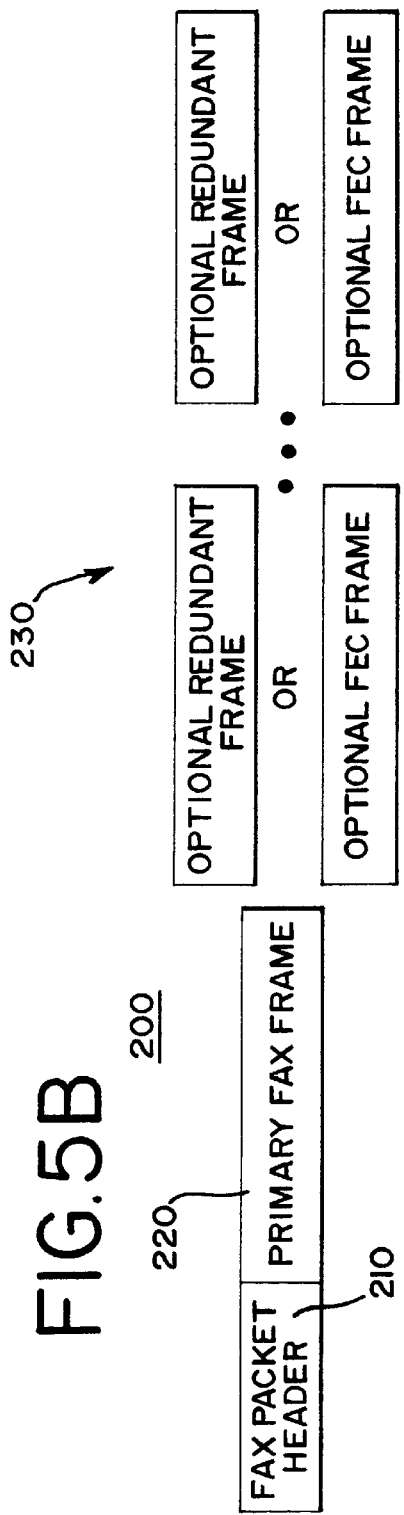

The facsimile packets 200 are created by the emitting gateway transport protocol driver 116. An example of the facsimile packet 200 is shown in FIG. 5B. The facsimile packet 200 in a preferred embodiment may include an error correction scheme, such as, for example, forward error correction (FEC) or redundancy. The facsimile packet 200 includes a facsimile packet header 210, a primary facsimile frame 220 and optional redundant frames 230. The facsimile packet 200 may therefore include more than one frame in the same packet.

Figures 5C, 5D:
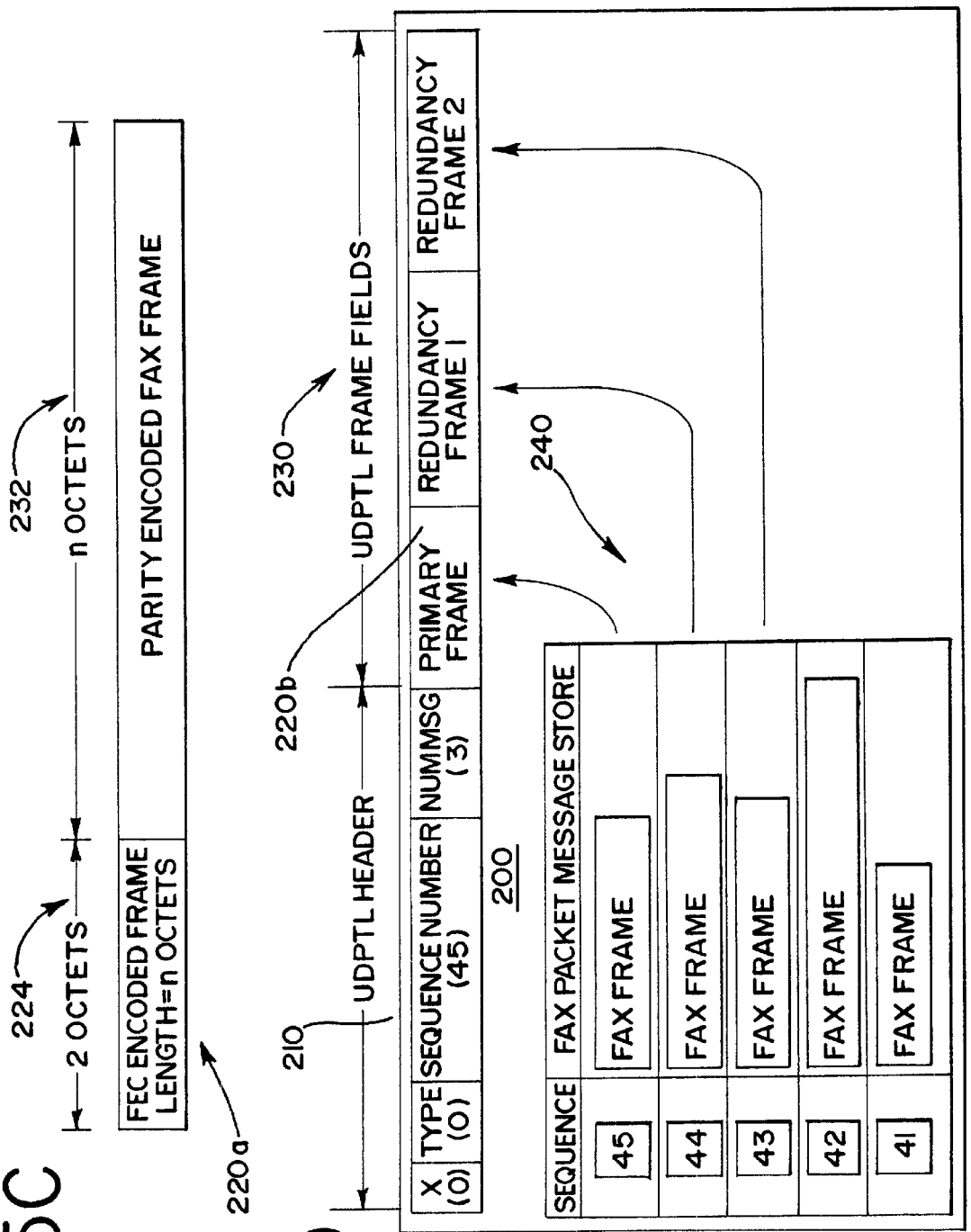

FIG. 5C shows an FEC encoded frame 220a. The FEC encoded frame 220a includes an FEC encoded message length 224 and a parity encoded facsimile frame 232. The FEC encoded message length 224 indicates, in octets, the size of the parity encoded facsimile frame 232. The parity-encoded facsimile frame 232 in a preferred embodiment includes a frame of facsimile data that has been encoded using parity encoded FEC. The T.38 Recommendation describes the FEC-encoded frame 220a such that a more detailed description is unnecessary.

Referring back to FIG. 4, the emitting transport protocol driver 116, in an alternative embodiment, may include an XOR-based FEC protocol. In the XOR-based FEC protocol, the emitting transport protocol driver 116 formats an XOR packet containing the XOR sum of the previous k network packets. Each network packet includes a single frame unless the FEC protocol is performed by the network I/O controller 156. During transmission, one lost network packet out of n=k+1 network packets may be dropped. The lost packet may be recovered using the XOR packet. For example, if the lost packet is the last packet, it may be recovered by performing the XOR function with the XOR packet. The result is the lost last packet. In another variation, r redundant packets may be sent out for each new packet to recover up to r lost network packets.

Referring to FIG. 5D, the facsimile packet 200 of FIG. 5B is shown using a redundancy-based forward error correction. The facsimile packet 200 in FIG. 5D includes a UDPTL header (according to T.38 Recommendation) 210, a primary frame 220b, and n redundant frames 230 where n=2 in FIG. 5D. The redundancy-based FEC protocol illustrated by FIG. 5D perform error correction by checking the redundant frames 230 received in each network packet with the primary frames 220b and the redundant frames 230 received in previous packets. 10 In the receiving gateway 70, the transport protocol used to format facsimile packets in the transmitting gateway 30 is used to analyze the facsimile packets to extract the payload. The network packets are received by the network I/O 156 in the network interface 46, which sends the facsimile packets to facsimile sender 102.

In the transmitting gateway 30, network packets may be received from the receiving gateway 70 as feedback according to T.30. For example, indications of an error in transmission are sent as feedback to the transmitting gateway 30. In a preferred embodiment, the network packets received at the transmitting gateway 30 from the receiving gateway 70 use the V.21 modulation protocol only.

The facsimile sender 102 includes a receiving facsimile transport protocol driver 122, a receiving facsimile signal control 124, a packet type indicator 128, a V.21 modulator 130, a V.high speed modulator 132, a feedback mode 138, a receive mode 136, an image decoder 140, and a scan line buffer 142. The receiving facsimile signal control 124 receives the CNG signal and outputs the CED signal to the transmitting gateway 30.

Other control functions such as, functions performed during call setup are also performed using the receiving facsimile signal control 124.

The receiving facsimile transport protocol 122 performs the transport protocol functions in the facsimile sender 102. One such function may include forward error control according to the FEC implementations discussed with reference to FIGS. 5A–5D.

The receiving facsimile transport protocol driver 122 makes the data in frames available to the packet type indicator 128. The packet type indicator 128 determines the modulation protocol that is to be used to modulate the data in the facsimile packets as the received facsimile signal. The modulation protocol may be the V.21 protocol in which case, the V.21 modulator 130 is used to modulate the data. The V.high speed signals may be modulated by the V.high speed modulator 132. The V.21 modulator 130 and the V.high speed modulator 132 receive the facsimile packets and output a G.711 data stream.

The facsimile packets received as feedback from the receiving gateway 70 are processed by the feedback mode 138. The feedback mode 138 determines whether the facsimile receiver 100 must change its modulation indicator 110 to detect a different data rate. One reason for this change may be an error condition detected by the receiving gateway 70 over a noisy line while the facsimile receiver 100 is operating using error correction mode.

The facsimile packets received from the transmitting gateway 30 are processed using receive mode 136, which also detects the portion of the signal comprising image data. The image data may be decoded by the optional image decoder 140 so that it can be buffered according to scan lines using the scan line buffer 142. The scan line buffer 142 stores a line of the image before it is sent to the receiving facsimile device 80. FILL characters may be used if the buffer underflows, i.e. a complete scan line was not received. The scan lines of image data are sent to the receiving facsimile device 80 via the TDM interface 104.

In an alternative embodiment, the image decoder 140 and the scan line buffer 142 are not used. The facsimile packets may be de-packetized and communicated directly to the receiving facsimile device 80 as the facsimile signal.

It is to be understood by those of ordinary skill in the art that the facsimile receiver 100 and the facsimile sender 102 shown in FIG. 4 are described to provide examples of a preferred embodiment.

E. Facsimile Communication Method

Using the systems described above with reference to FIGS. 1–5, a method for communicating a facsimile reliably in real-time may include the steps shown in Table 2.

TABLE 2

Method for communicating facsimile in real-time over the Internet

1. Generating a facsimile signal representing an encoded image and transmitting the facsimile signal over a general switched telephone network connection to a transmitting gateway at a modulation data rate.

TABLE 2-continued

Method for communicating facsimile in real-time over the Internet

2. Detecting the facsimile signal at the transmitting gateway.
3. Converting the facsimile signal to a data network signal when the facsimile signal is received at the modulation data rate without decoding the image.
4. Transporting the data network signal over a data network to a receiving gateway.
5. Converting the data network signal to a received facsimile signal.
6. Sending the received facsimile signal to a second facsimile device.

FIG. 6 shows a state transition diagram for two state machines, a transmit facsimile state machine 250, which is employed in the transmitting gateway 30, and a receive facsimile state machine 275 employed in the receiving gateway 70. The transmit facsimile state machine 250 receives the facsimile signal from the GSTN connection 32. The Internet 50 is shown between the transmitting state machine 250 and the receiving state machine 275 over which the data network signal (network packets) are communicated.

In the transmit facsimile state machine 250, a transmit CNG state 300 and a receive CNG state 340 are included to handle the CNG signal transmission from transmitting facsimile device 20 to receiving facsimile device 80. In both state machines 250, 275, a transition is made to the transmit CED state 302 and the receive CED state 347, which are states that handle the CED signal.

Once the call is setup, the transmit facsimile state machine 250 expects to handle data coming in V.DCS or V.CTC, which is used in ECM (error correction mode) transmissions. When the V.21 facsimile signal is received, it is sent as packets over the Internet 50 from a first V.21 state 306 and a second V.21 state 312. In the V.21 states 306, 312, a transition is made to a V.DCS state 308 if the DCS signal indicates a higher data rate, but not continue to correct (CTC) will be used. Similarly, a transition is made to a V.CTC state 314 if the CTC signal is detected. Transitions are made back to the V.21 states 306, 312 if V.21 is detected. In a preferred embodiment, the transmitting state machine 250 returns to the V.DCS state 308 and the V.CTC state 314 after any data is received from the receiver gateway. If V.21 data is detected instead, the transition to the V.21 states 306, 312 is made.

The receiving state machine 275 returns primarily to a receiver V.21 state 344. Any data that is to be transmitted as feedback to the transmitting state machine 250 is communicated at V.21. The V.DCS and V.CTC signals are only handled by the receiving state machine 275 to be transmitted to the receiving facsimile device 80.

A first and second V.21 receive states 304, 310 are used to process feedback signals received from the receiving facsimile device 80. The V.21 receive states 304, 310 may receive a message confirmation frame (MCF) or confirmation to receive (CFR), which may be used by the state machine 250 to transition to the V.DCS state 308.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

We claim:

1. A system for communicating a facsimile comprising:
a first and second facsimile device connected to a general switched telephone network, the first and second facsimile devices being operable to send and receive a facsimile signal over the general switched telephone network, the facsimile signal being generated by encoding an image and sending the encoded image over the general switched telephone network at a modulation data rate;

a transmitting gateway connected to the general switched telephone network and to a data network, the transmitting gateway comprising:
a facsimile receiver for receiving the facsimile signal, the facsimile receiver being operable to detect the modulation data rate and to convert the facsimile signal to a plurality of data units when the modulation data rate is detected; and a transmitting network interface for formatting the data units as a data network signal and for transmitting the data network signal over the data network;

the data network being operable to transport the data network signal to a receiving gateway, the receiving gateway comprising:
a receiving network interface for receiving the data network signal; and a facsimile sender for converting the data network signal to a received facsimile signal and for sending the received facsimile signal over the general switched telephone network to the second facsimile device.

2. A system as claimed in claim 1 wherein:
the facsimile receiver includes a modulation indicator for indicating a second modulation data rate for the facsimile signal; and wherein
the facsimile receiver is operable to sense the second modulation data rate and to convert the facsimile signal to a plurality of data units when the second modulation data rate is detected.

3. A system as claimed in claim 1 wherein the facsimile receiver includes a demodulator for demodulating the facsimile signal, the demodulator being operable to transform the facsimile signal to a plurality of digital bits.

4. A system as claimed in claim 3 wherein the plurality of digital bits are collected in a plurality of facsimile packets, each facsimile packet comprising a selected number of digital bits.

5. A system as claimed in claim 4 wherein each data unit is a facsimile packet.

6. A system as claimed in claim 3 wherein the plurality of digital bits are collected in a plurality of frames, each frame comprising a selected number of digital bits.

7. A system as claimed in claim 6 wherein each data unit is a facsimile packet comprising at least one frame.

8. A system as claimed in claim 7 wherein the data network signal includes at least one facsimile packet.

9. A system as claimed in claim 8 wherein the data network signal is transported over the data network using a connection-less protocol.

10. A system as claimed in claim 9 wherein the connection-less protocol is the User Datagram Protocol (UDP).

11. A system as claimed in claim 10 wherein the data network signal is transported using a forward error correction protocol.

12. A system as claimed in claim 11 wherein the forward error correction protocol is an XOR-based forward error correction protocol.

13. A system as claimed in claim 12 wherein:
the facsimile receiver is operable to transmit an XOR packet containing an XOR sum of k packets;

the facsimile sender is operable to receive the XOR packet after receiving
the k packets; and wherein:
the XOR-based forward error correction protocol includes a packet generator for generating a lost packet using the XOR packet.

14. A system as claimed in claim 10 wherein the data network signal includes sequences of packets, each packet including information about the previous packet; and wherein the receiving gateway includes a forward error correction module for ordering the packets by using the information about previous packets in each packet.

15. A system as claimed in claim 10 wherein the data network signal includes a sequence of frames, the sequence of frames comprising a primary frame and n redundant frames, each of the n redundant frames being previous primary frames in data network signals.

16. A system as claimed in claim 1 wherein the data network signal is transported over the data network using a connection-oriented protocol.

17. A system as claimed in claim 16 wherein the connection-oriented protocol is Transport Control Protocol (TCP).

18. A system as claimed in claim 1 wherein the data network signal is transported over the data network using a connection-less protocol.

19. A system as claimed in claim 18 wherein the connection-less protocol is the User Datagram Protocol (UDP).

20. A system as claimed in claim 19 wherein the data network signal is transported using a forward error correction protocol.

21. A system as claimed in claim 20 wherein the forward error correction protocol is an XOR-based error correction protocol.

22. A system as claimed in claim 18 wherein the data network signal includes sequences of packets, each packet including information about the previous packet; and wherein the receiving gateway includes a forward error correction module for ordering the packets by using the information about previous packets in each packet.

23. A system as claimed in claim 1 wherein the facsimile sender includes a facsimile image sender to decode portions of the image in the received facsimile signal, the facsimile sender being operable to send the received facsimile signal to the second facsimile device as a second received facsimile signal comprising decoded portions of the image.

24. A system as claimed in claim 23 wherein the portions of the image decoded by the facsimile image sender include at least one scan line.

25. A system as claimed in claim 24 further comprising a scan line buffer for storing at least one scan line prior to sending to the second facsimile device.

26. A system as claimed in claim 23 wherein the portions of the image decoded by the facsimile image sender include a scanned page.

27. A system for communicating a facsimile comprising:
a first and second facsimile device connected to a general switched telephone network, the first and second facsimile devices being operable to send and receive a facsimile signal over the general switched telephone network, the facsimile signal being generated by encoding an image according to a facsimile protocol and being sent using a modulation protocol having a modulation data rate;
a transmitting gateway connected to the general switched telephone network and to a data network, the transmitting gateway comprising:

a facsimile receiver for receiving the facsimile signal, the facsimile receiver being operable to detect the facsimile signal by detecting the modulation data rate and to convert the facsimile signal, without decoding the image, to a plurality of data units when the modulation data rate is detected; and
a transmitting network interface for formatting the data units as a data network signal and for transmitting the data network signal over the data network;
the data network being operable to transport the data network signal to a receiving gateway, the receiving gateway comprising:
a receiving network interface for receiving the data network signal; and
a facsimile sender for converting the data network signal to a received facsimile signal and for sending the received facsimile signal over the general switched telephone network to the second facsimile device.

28. A system as claimed in claim 27 wherein the modulation protocol in the first and second facsimile devices is the V.21 protocol.

29. A system as claimed in claim 28 wherein the facsimile protocol used to encode the image is the T.30 recommendation.

30. A system as claimed in claim 29 wherein and the facsimile receiver detects a digital signal command at V.21 and senses the facsimile signal by detecting the modulation data rate indicated by the digital signal command.

31. A system as claimed in claim 30 wherein the facsimile signal includes control information and the facsimile sender is operable to convert the control information to a plurality of control data units without decoding the control information.

32. A system as claimed in claim 30 wherein the facsimile sender detects a continue to correct signal and senses the facsimile signal at reduced data rates when an error condition is sensed.

33. A method for communicating a facsimile comprising the steps of:
generating a facsimile signal representing an encoded image and transmitting the facsimile signal over a general switched telephone network connection to a transmitting gateway at a modulation data rate;
detecting the facsimile signal at the transmitting gateway;
converting the facsimile signal to a data network signal when the facsimile signal is received at the modulation data rate without decoding the image;
transporting the data network signal over a data network to a receiving gateway;
converting the data network signal to a received facsimile signal; and sending the received facsimile signal to a second facsimile device.

34. A method as claimed in claim 33 wherein the step of detecting the facsimile signal includes the step of detecting a calling signal.

35. A method as claimed in claim 34 wherein the step of converting the facsimile signal to a data network signal includes the step of converting the calling signal to a calling signal packet; and the step of transporting the data network signal includes the step of transporting the calling signal packet.

36. A method as claimed in claim 34 further comprising the steps of:
decoding the facsimile signal at the second facsimile device; and generating an image substantially the same as the encoded image from the facsimile signal.

37. A method as claimed in claim 36 wherein the step of detecting the facsimile signal includes the step of detecting a calling signal.

38. A method as claimed in claim 37 wherein the step of converting the facsimile signal to a data network signal includes the step of converting the calling signal to a calling signal packet; and the step of transporting the data network signal includes the step of transporting the calling signal packet.

39. A method as claimed in claim 38 wherein the step of decoding the facsimile signal at the second facsimile device further comprises the step of decoding the calling signal, the method further comprising the step of sending a called signal to the first facsimile device.

40. A method as claimed in claim 39 wherein the step of sending the called signal to the first facsimile device includes the steps of:

sending the called signal to the receiving gateway;

converting the called signal to a called signal packet; and transporting the called signal packet over the data network to the transmitting gateway.

41. A method as claimed in claim 36 wherein the step of decoding the image comprises the step of detecting error conditions, the method further comprising the steps of:

generating a facsimile error signal; and sending the facsimile error signal to the first facsimile device.

42. A method as claimed in claim 41 wherein the step of sending the facsimile error signal includes the steps of:

sending the facsimile error signal to the receiving gateway;

converting the facsimile error signal to an error signal packet; and transporting the error signal packet over the data network to the transmitting gateway.

43. A method as claimed in claim 33 wherein the step of converting the facsimile signal includes the steps of:

detecting a digital command signal to determine a modulation data rate; and using the modulation data rate to detect the facsimile signal.

44. A method as claimed in claim 43 wherein the step of detecting the modulation indicator includes the step of detecting a continue to correct command and the method includes the steps of:

determining if the general switched telephone network connection is noisy; and switching to a slower data rate than the modulation data rate when the connection is noisy.

45. A system for communicating a facsimile comprising:

a first and second facsimile device connected to a general switched telephone network. the first and second facsimile devices being operable to send and receive a facsimile signal over the general switched telephone network, the facsimile signal being generated by encoding an image and sending the encoded image over the general switched telephone network at a modutation data rate;

a transmitting gateway connected to the general switched telephone network and to a data network, the transmitting gateway comprising:

a facsimile receiver for receiving the facsimile signal, the facsimile receiver being operable to detect the modulation data rate and to convert the facsimile signal to a plurality of data units when the modulation data rate is detected, the facsimile receiver further comprising a modulation indicator for indicating a second modulation data rate for the facsimile signal and being operable to sense the second modulation data rate and to convert the facsimile signal to a plurality of data units when the second modulation data rate is detected; and a transmitting network Interface for formatting the data units as a data network signal and for transmitting the data network signal over the data network;

the data network being operable to transport the data network signal to a receiving gateway, the receiving gateway comprising:

a receiving network interface for receiving the data network signal; and a facsimile sender for converting the data network signal to a received facsimile signal and for sending the received facsimile signal over the general switched telephone network to the second facsimile device.

46. A system for communicating a facsimile comprising:

a first and second facsimile device connected to a general switched telephone network, the first and second facsimile devices being operable to send and receive a facsimile signal over the general switched telephone network, the facsimile signal being generated by encoding an image and sending the encoded image over the general switched telephone network at a modulation data rate;

a transmitting gateway connected to the general switched telephone network and to a data network, the transmitting gateway comprising:

a facsimile receiver for receiving the facsimile signal, the facsimile receiver being operable to detect the modulation data rate and to convert the facsimile signal to a plurality of data units when the modulation data rate is detected, the facsimile receiver further including a demodulator for demodulating the facsimile signal, the demodulator being operable to transform the facsimile signal to a plurality of digital bits collected in a plurality of frames, each frame comprising a selected number of digital bits, wherein each data unit is a facsimile packet comprising at least one frame; and a transmitting network interface for formatting the data units as a data network signal comprising at least one facsimile packet and for transmitting the data network signal over the data network using a connection-less protocol and a forward error correction protocol;

the data network being operable to transport the data network signal to a receiving gateway, the receiving gateway comprising:

a receiving network interface for receiving the data network signal; and a facsimile sender for converting the data network signal to a received facsimile signal and for sending the received facsimile signal over the general switched telephone network to the second facsimile device.

47. A system as claimed in claim 46 wherein the connecUon-less protocol is the User Datagram Protocol (UDP).

48. A system as claimed in claim 46 wherein the forward error correction protocol is an XOR-based forward error correction protocol.

49. A system as claimed in claim 46 wherein:
the facsimile receiver is operable to transmit an XOR packet containing an XOR sum of k packets;
the facsimile sender is operable to receive the XOR packet after receiving the k packets; and wherein:
the XOR-based forward error correction protocol includes a packet generator for generating a lost packet using the XOR packet.

50. A system as claimed in claim 46 wherein the data network signal includes sequences of packets, each packet including information about the previous packet: and wherein the receiving gateway includes a forward error correction module for ordering the packets by using the information about previous packets in each packet.

51. A system as claimed in claim 46 wherein the data network signal includes a sequence of frames, the sequence of frames comprising a primary frame and n redundant frames, each of the n redundant frames being previous primary frames in data network signals.

52. A system for communicating a facsimile comprising:
a first and second facsimile device connected to a general switched telephone network, the first and second facsimile devices being operable to send and receive a facsimile signal over the general switched telephone network, the facsimile signal being generated by encoding an image and sending the encoded image over the general switched telephone network at a modulation data rate;
a transmitting gateway connected to the general switched telephone network and to a data network, the transmitting gateway comprising:
a facsimile receiver for receiving the facsimile signal, the facsimile receiver being operable to detect the modulation data rate and to convert the facsimile signal to a plurality of data units when the modulation data rate is detected; and
a transmitting network interface for formatting the data units as a data network signal and for transmitting the data network signal over the data network using a connection-less protocol and a forward error correction protocol;
the data network being operable to transport the data network signal to a receiving gateway, the receiving gateway comprising:
a receiving network interface for receiving the data network signal; and
a facsimile sender for converting the data network signal to a received facsimile signal and for sending the received facsimile signal over the general switched telephone network to the second facsimile device.

53. A system as claimed in claim 52 wherein the connection-less protocol is the User Datagram Protocol (UDP).

54. A system as claimed in claim 52 wherein the forward error correction protocol is an XOR-based error correction protocol.

55. A system as claimed in claim 52 wherein the data network signal includes sequences of packets, each packet including information about the previous packet; and wherein the receiving gateway includes a forward error correction module for ordering the packets by using the information about previous packets in each packet.

56. A system for communicating a facsimile comprising:
a first and second facsimile device connected to a general switched telephone network, the first and second facsimile devices being operable to send and receive a facsimile signal over the general switched telephone network, the facsimile signal being generated by encoding an image according to the T.30 protocol and being sent using a V.21 protocol having a modulation data rate;
a transmitting gateway connected to the general switched telephone network and to a data network, the transmitting gateway comprising;
a facsimile receiver for receiving the facsimile signal, the facsimile receiver being operable to detect the facsimile signal by detecting the V.21 modulation data rate and to convert the facsimile signal without decoding the image, to a plurality of data units when the modulation data rate is detected; and
a transmitting network interface for formatting the data units as a data network signal and for transmitting the data network signal over the data network;
the data network being operable to transport the data network signal to a receiving gateway, the receiving gateway comprising:
a receiving network interface for receiving the data network signal; and
a facsimile sender for converting the data network signal to a received facsimile signal and for sending the received facsimile signal over the general switched telephone network to the second facsimile device.

57. A system as claimed in claim 56 wherein the facsimile receiver detects a digital signal command at V.21 and senses the facsimile signal by detecting the V.21 modulation data rate indicated by the digital signal command.

58. A system as claimed in claim 56 wherein the facsimile signal includes control information and the facsimile sender is operable to convert the control information to a plurality of control data units without decoding the control information.

59. A system as claimed in claim 56 wherein the facsimile sender detects a continue to correct signal and senses the facsimile signal at reduced data rates when an error condition is sensed.

60. A method for communicating a facsimile comprising the steps of:
generating a facsimile signal representing an encoded image and transmitting the facsimile signal over a general switched telephone network connection to a transmitting gateway at a modulation data rate;
detecting the facsimile signal at the transmitting gateway by a method that includes the step of detecting a calling signal;
converting the facsimile signal to a data network signal when the facsimile signal is received at the modulation data rate without decoding the image;
transporting the data network signal over a data network to a receiving gateway;
converting the data network signal to a received facsimile signal;
sending the received facsimile signal to a second facsimile device;
decoding the facsimile signal at the second facsimile device by detecting error conditions by a method comprising the steps of:
generating a facsimile error signal; and sending the facsimile error signal to the first facsimile device; and generating an image substantially the same as the encoded image from the facsimile signal.

61. A method as claimed in claim 60 wherein the step of sending the facsimile error signal includes the steps of:

sending the facsimile error signal to the receiving gateway;

converting the facsimile error signal to an error signal packet; and transporting the error signal packet over the data network to the transmitting gateway.

62. A method as claimed in claim 60 wherein the step of converting the facsimile signal includes the steps of:

detecting a digital command signal to determine a modulation data rate; and using the modulation data rate to detect the facsimile signal.

63. A method as claimed in claim 62 wherein the step of detecting the molulatlon Indicator Includes the step of detecting a continue to correct command and the method includes the steps of:

determining if the general switched telephone network connection is noisy: and switching to a slower data rate than the modulation data rate when the connection is noisy.

* * * * *